July 25, 1961 V. R. PAOLUCCI 2,993,726
AUTOMOBILE FLOOR MAT
Filed Sept. 11, 1959

INVENTOR.
VINCENT R. PAOLUCCI
BY Hudson, Boughton,
Williams, David & Hoffman
ATTORNEYS

2,993,726
AUTOMOBILE FLOOR MAT
Vincent R. Paolucci, 1391 Ranchland Drive,
Cleveland 24, Ohio
Filed Sept. 11, 1959, Ser. No. 839,369
1 Claim. (Cl. 296—1)

The present invention relates to floor mats and more particularly to a floor mat for use in the passenger compartment of an automotive vehicle.

One of the recent trends in automotive design and more particularly in the design of passenger automobiles has been that of reducing the overall height of the vehicle as much as possible consistent with necessary passenger space. One of the results of the trend referred to has been the lowering of the floor or floor pan of the passenger compartments and more particularly the floor between the front and rear seats of two seated automobiles. The floors is now well below the door sills and, because of certain limitations imposed by the construction of the chassis, most automobiles have a longitudinal hum in the floor midway between the sides of the car for the accommodation of the drive shaft.

One of the principal objects of the present invention is the provision of a floor mat for automotive vehicles which does not conform to the irregular shape of the floor but which is constructed for installation in the automobile such that it normally extends straight across the car from one door sill to the other, but which will yield when a passenger enters a car and steps on it so as not to interfere with or lessen the amount of leg room provided in the car.

The invention resides in certain constructions, combinations and arrangement of parts and further objects and advantages will be apparent from the following description of two preferred embodiments described with reference to the accompanying drawings forming a part of this specification in which similar reference characters designate corresponding parts, and in which.

Figure 1:
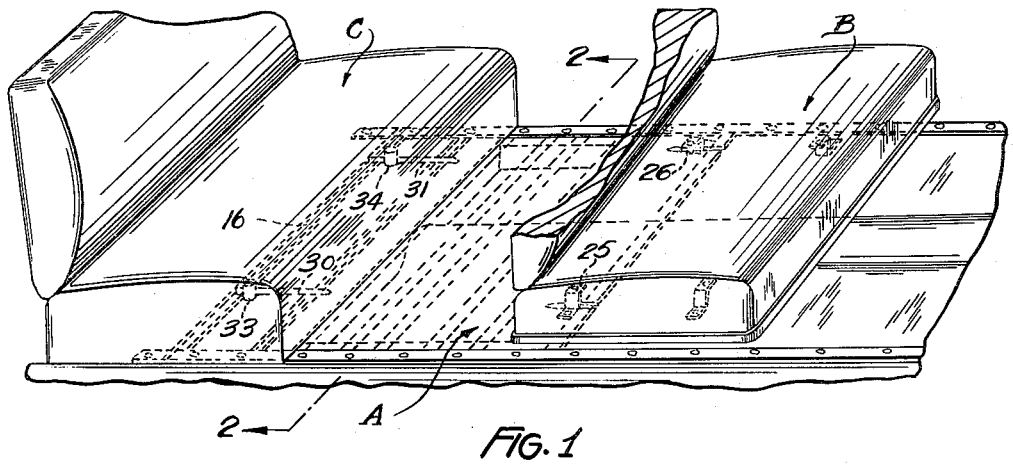
FIG. 1 is a fragmentary perspective view showing the front and rear seats of a passenger automobile with a floor mat embodying the present invention installed therebetween.

The floor mat shown in FIGS. 1 to 4 and designated generally by the reference character A comprises a piece of relatively heavy cloth-like material extending from one side of the automobile to the other and from underneath the front seat B to a point underneath the rear seat C. Opposite front and rear edges 15, 16 of the mat A have portions 17, 18 bent back upon themselves to provide loops for the reception of flat rigid members 20, 21 preferably made of metal or other suitable material employed in securing the front and rear edges of the mat underneath the front and rear seats respectively. The front edge 15 of the mat A is provided with suitable apertures or openings 22, 23 for the reception of brackets 25, 26 forming a part of the seat construction. After the front edge of the mat is positioned about the brackets 25, 26 the member 20 is inserted or threaded through the loops such that the member 20 engages against the brackets to hold the mat taut.

The rear edge 16 of the mat A is provided with apertures 30, 31 similar to the apertures in the front edge 15 and is secured undereath the rear seat C in a manner similar to that in which the front edge 15 is secured underneath the front seat B, but in this instance separate brackets 33, 34 are provided since suitable brackets are not present in the automobile as initially constructed. The brackets 33, 34 are connected to the floor pan of the body of the automobile underneath the rear cushion. Like the front edge 15 of the mat A, the rear edge 16 is fitted into position with the brackets 33, 34 located in the slots 30, 31 and with the rigid member 21 projecting through the loops therein. The front and rear brackets hold the floor mat taut between the two seats.

In the embodiment shown opposite longitudinal side edges of the mat A are provided with small beads which are engaged underneath the inner edges of the trim strips 35, 36, located along opposite door sills 40, 41 of the automobile.

The mat shown in FIGS. 1 to 4 is made of a piece of material, the normal width of which is considerably greater than the width of the car and has a plurality of elastic strips 42 sewed upon the underside thereof. In sewing the elastic strips to the material, the strips are stretched so that they are as long as the material is wide. This results in the material being shirred along the strips when they are permitted to return to their normal length.

Figures 2, 6, 7:
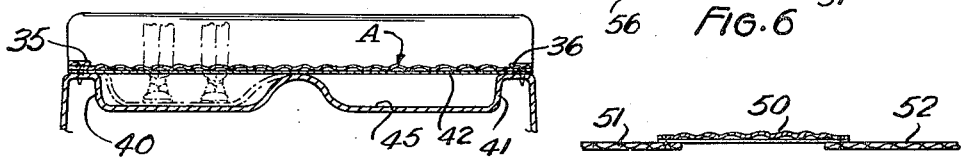
FIG. 2 is a sectional view through the floor mat approximately on the line 2—2 of FIG. 1.
FIG. 6 is a sectional view approximately on line 6—6 of FIG. 5.
FIG. 7 is a sectional view approximately on the line 7—7 of FIG. 6.
Figure 4:
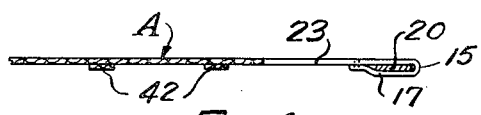
FIG. 4 is a sectional view approximately on line 4—4 of FIG. 3.

The construction is such that, although the floor mat normally extends straight across the automobile from one side to the other and from one seat to the other at a height equal to or level with that of the door sill, when a passenger enters the automobile and steps on the mat it readily stretches down to the floor pan or floor proper, designated by the reference character 45, in a manner similar to that shown in FIG. 2, and thus does not interfere or reduce the normal leg room provided in the automobile.

Figures 3, 5:
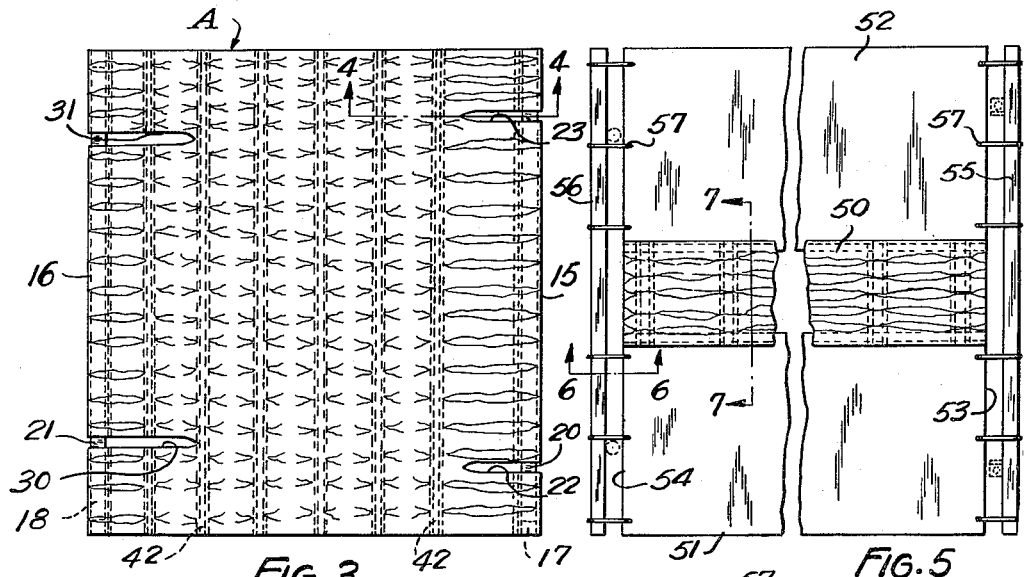
FIG. 3 is a plan view of the floor mat.
FIG. 5 is a view similar to FIG. 3, but showing a floor mat of modified construction.

The floor mat shown in FIGS. 5, 6 and 7 is generally similar to that shown in the preceding figures. The principal distinction is that only the center portion 50 of the mat, designated generally by the reference character D, is made of shirred material similar to that employed in the mat A. The portions of the mat 51, 52 on opposite sides of the center portion 50 are made of suitable relatively non-elastic floor covering material. This material may be any suitable floor covering material. In this embodiment the front and rear edges 53, 54 of the mat are secured to rigid members 55, 56 respectively, similar to the rigid members 20, 21 previously referred to, by wire-like loops 57 projecting through the respective edges of the mat and about the rigid member adjacent thereto. The wire-loops are long enough to accommodate the brackets 25, 26 and 33, 34 therebetween and the adjacent edge of the mat.

In both of the embodiments shown the necessary elasticity is obtained by providing a specific construction, that is, shirred material sewed onto elastic strips which gives a pleasing appearance. It is to be understood, however, that other constructions are contemplated by the present invention. For example, the entire mat or portions thereof may be made of plain or decorated smooth rubber-like material, elastic woven material, etc.

While the two preferred embodiments of the invention have been described in considerable detail, the invention is not limited to the particular construction shown and means for attaching the mat to the automobile and it is the intention to hereby cover all adaptations, modifications and uses thereof which come within the practice of those skilled in the art to which the invention relates and the scope of the appended claim.

Having thus described my invention, what I claim is:

A floor mat adapted for use between two seats of a passenger automotive vehicle having the door sills thereof higher than the floor proper, said mat comprising a resilient sheet-like member adapted to extend from a position underneath the forward seat of the vehicle to a position underneath the back seat of the vehicle and from one side of the vehicle to the other at the level of the door sills, and means for attaching the front and rear edges of said member underneath the forward and back seats of the automobile, said mat being drawn taut by said attaching means from one side of the automobile to the other so that the entire mat will be substantially at the level of the door sills and above the floor proper and being further so constructed that it can be conveniently secured along both sides of the automotive vehicle at the level of the door sills and will yield to the floor proper under the weight of a passenger entering the vehicle so as not to substantially reduce the normal leg room provided in the automotive vehicle.

References Cited in the file of this patent

UNITED STATES PATENTS

| | | |
|---|---|---|
| 2,627,425 | McNamara | Feb. 3, 1953 |
| 2,689,765 | Lindsay | Sept. 21, 1954 |
| 2,709,105 | Kramer | May 24, 1955 |